United States Patent
Zdornov et al.

(10) Patent No.: US 10,389,646 B2
(45) Date of Patent: Aug. 20, 2019

(54) EVADING CONGESTION SPREADING FOR VICTIM FLOWS

(71) Applicant: Mellanox Technologies TLV Ltd., Raanana (IL)

(72) Inventors: Vladimir Zdornov, Kfar Saba (IL); Eitan Zahavi, Zichron Yaakov (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 0 days.

(21) Appl. No.: 15/432,962

(22) Filed: Feb. 15, 2017

(65) Prior Publication Data

US 2018/0234343 A1 Aug. 16, 2018

(51) Int. Cl.
*H04L 12/833* (2013.01)
*H04L 12/863* (2013.01)
*H04L 12/801* (2013.01)

(52) U.S. Cl.
CPC ............ *H04L 47/31* (2013.01); *H04L 47/621* (2013.01); *H04L 47/39* (2013.01)

(58) Field of Classification Search
None
See application file for complete search history.

(56) References Cited

U.S. PATENT DOCUMENTS

| | | | |
|---|---|---|---|
| 6,108,713 A | 8/2000 | Sambamurthy et al. | |
| 6,178,448 B1 | 1/2001 | Gray et al. | |
| 6,594,263 B1 | 7/2003 | Martinsson et al. | |
| 7,321,553 B2 | 1/2008 | Prasad et al. | |
| 7,346,059 B1 | 3/2008 | Garner et al. | |
| 7,738,454 B1 | 6/2010 | Panwar et al. | |
| 7,821,939 B2 | 10/2010 | Decusatis et al. | |
| 8,023,413 B2 * | 9/2011 | Kadambi | H04L 12/4641 370/235 |

(Continued)

FOREIGN PATENT DOCUMENTS

| | | |
|---|---|---|
| EP | 1720295 A1 | 11/2006 |
| EP | 2466476 A1 | 6/2012 |

(Continued)

OTHER PUBLICATIONS

Hahne et al., "Dynamic Queue Length Thresholds for Multiple Loss Priorities", IEEE/ACM Transactions on Networking, vol. 10, No. 3, pp. 368-380, Jun. 2002.

(Continued)

*Primary Examiner* — Chirag G Shah
*Assistant Examiner* — Amarnauth G Persaud
(74) *Attorney, Agent, or Firm* — Kligler & Associates

(57) ABSTRACT

A network switch includes switching circuitry and multiple ports. The multiple ports are connected to a communication network. The switching circuitry is configured to receive via the ports packets that are assigned respective Virtual Lanes (VLs), and forward each packet for transmission via a respective selected port, to queue the packets pending for transmission via a given port in multiple VL-dedicated queues, in accordance with the VLs assigned to the packets, to mark an outbound packet, pending for transmission via the given port, with multiple congestion indications that are indicative of respective congestion states of the multiple VL-dedicated queues of the given port, and to transmit the marked outbound packet via the given port.

8 Claims, 4 Drawing Sheets

(56) References Cited

U.S. PATENT DOCUMENTS

| | | | |
|---|---|---|---|
| 8,078,743 | B2 | 12/2011 | Sharp et al. |
| 8,345,548 | B2 | 1/2013 | Gusat et al. |
| 8,473,693 | B1 | 6/2013 | Muppalaneni et al. |
| 8,576,715 | B2 | 11/2013 | Bloch et al. |
| 8,630,294 | B1 | 1/2014 | Keen et al. |
| 8,767,561 | B2 | 7/2014 | Gnanasekaran et al. |
| 8,804,529 | B2 * | 8/2014 | Bergamasco ........... H04L 47/10 370/229 |
| 8,811,183 | B1 * | 8/2014 | Anand .................... H04L 49/25 370/237 |
| 8,879,396 | B2 | 11/2014 | Guay et al. |
| 8,989,017 | B2 | 3/2015 | Naouri |
| 8,995,265 | B2 | 3/2015 | Basso et al. |
| 9,014,006 | B2 | 4/2015 | Haramaty et al. |
| 9,325,619 | B2 | 4/2016 | Guay et al. |
| 9,356,868 | B2 | 5/2016 | Tabatabaee et al. |
| 9,426,085 | B1 | 8/2016 | Anand et al. |
| 9,648,148 | B2 * | 5/2017 | Rimmer ................. H04L 69/22 |
| 2002/0055993 | A1 | 5/2002 | Shah et al. |
| 2002/0141427 | A1 * | 10/2002 | McAlpine .............. H04L 47/39 370/413 |
| 2002/0191559 | A1 | 12/2002 | Chen et al. |
| 2003/0108010 | A1 | 6/2003 | Kim et al. |
| 2003/0223368 | A1 | 12/2003 | Allen et al. |
| 2004/0008714 | A1 | 1/2004 | Jones |
| 2005/0053077 | A1 | 3/2005 | Blanc et al. |
| 2005/0169172 | A1 | 8/2005 | Wang et al. |
| 2005/0216822 | A1 | 9/2005 | Kyusojin et al. |
| 2005/0226156 | A1 | 10/2005 | Keating et al. |
| 2005/0228900 | A1 * | 10/2005 | Stuart .................. G06Q 40/025 709/234 |
| 2006/0008803 | A1 | 1/2006 | Brunner et al. |
| 2006/0087989 | A1 * | 4/2006 | Gai ....................... H04L 12/413 370/299 |
| 2006/0092837 | A1 | 5/2006 | Kwan et al. |
| 2006/0092845 | A1 | 5/2006 | Kwan et al. |
| 2007/0097257 | A1 | 5/2007 | El-Maleh et al. |
| 2007/0104102 | A1 | 5/2007 | Opsasnick |
| 2007/0104211 | A1 | 5/2007 | Opsasnick |
| 2007/0201499 | A1 | 8/2007 | Kapoor et al. |
| 2007/0291644 | A1 | 12/2007 | Roberts et al. |
| 2008/0025217 | A1 * | 1/2008 | Gusat .................. H04L 43/0864 370/232 |
| 2008/0037420 | A1 | 2/2008 | Tang et al. |
| 2008/0175146 | A1 | 7/2008 | Van Leekwuck et al. |
| 2008/0192764 | A1 | 8/2008 | Arefi et al. |
| 2009/0207848 | A1 | 8/2009 | Kwan et al. |
| 2010/0220742 | A1 | 9/2010 | Brewer et al. |
| 2013/0014118 | A1 | 1/2013 | Jones |
| 2013/0039178 | A1 | 2/2013 | Chen et al. |
| 2013/0250757 | A1 | 9/2013 | Tabatabaee et al. |
| 2013/0250762 | A1 | 9/2013 | Assarpour |
| 2013/0275631 | A1 | 10/2013 | Magro et al. |
| 2013/0286834 | A1 | 10/2013 | Lee |
| 2013/0305250 | A1 | 11/2013 | Durant |
| 2014/0133314 | A1 | 5/2014 | Mathews et al. |
| 2014/0269274 | A1 | 9/2014 | Banavalikar et al. |
| 2014/0269324 | A1 | 9/2014 | Tietz et al. |
| 2015/0026361 | A1 | 1/2015 | Matthews et al. |
| 2015/0055478 | A1 * | 2/2015 | Tabatabaee ............ H04L 47/11 370/236 |
| 2015/0103667 | A1 * | 4/2015 | Elias ...................... H04L 47/11 370/236 |
| 2015/0124611 | A1 | 5/2015 | Attar et al. |
| 2015/0127797 | A1 | 5/2015 | Attar et al. |
| 2015/0180782 | A1 | 6/2015 | Rimmer et al. |
| 2015/0200866 | A1 | 7/2015 | Pope et al. |
| 2015/0282003 | A1 * | 10/2015 | Noerpel ............. H04B 7/18584 370/236 |
| 2015/0381505 | A1 | 12/2015 | Sundararaman et al. |
| 2016/0135076 | A1 | 5/2016 | Grinshpun et al. |
| 2016/0294696 | A1 | 10/2016 | Gafni et al. |
| 2016/0344636 | A1 | 11/2016 | Elias et al. |
| 2017/0118108 | A1 * | 4/2017 | Avci ....................... H04L 45/36 |
| 2017/0142020 | A1 | 5/2017 | Sundararaman et al. |
| 2017/0180261 | A1 | 6/2017 | Ma et al. |
| 2017/0187641 | A1 | 6/2017 | Lundqvist et al. |
| 2017/0295112 | A1 | 10/2017 | Cheng et al. |
| 2018/0205653 | A1 | 7/2018 | Wang et al. |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

Choudhury et al., "Dynamic Queue Length Thresholds for Shared-Memory Packet Switches", IEEE/ACM Transactions Networking, vol. 6, Issue 2 , pp. 130-140, Apr. 1998.

CISCO Systems, Inc.,"Advantage Series White Paper Smart Buffering", 10 pages, 2016.

Ramakrishnan et al., "The Addition of Explicit Congestion Notification (ECN) to IP", Request for Comments 3168, Network Working Group, 63 pages, Sep. 2001.

IEEE Standard 802.1Q™-2005, "IEEE Standard for Local and metropolitan area networks Virtual Bridged Local Area Networks", 303 pages, May 19, 2006.

INFINIBAND TM Architecture, Specification vol. 1, Release 1.2.1, Chapter 12, pp. 657-716, Nov. 2007.

IEEE Std 802.3, Standard for Information Technology—Telecommunications and information exchange between systems—Local and metropolitan area networks—Specific requirements; Part 3: Carrier Sense Multiple Access with collision Detection (CSMA/CD) Access Method and Physical Layer Specifications Corrigendum 1: Timing Considerations for Pause Operation, Annex 31B (MAC Control PAUSE operation), pp. 763-772, year 2005.

IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

Hoeiland-Joergensen et al., "The FlowQueue-CoDel Packet Scheduler and Active Queue Management Algorithm", Internet Engineering Task Force (IETF) as draft-ieff-aqm-fq-codel-06 , 23 pages, Mar. 18, 2016.

Gafni et al., U.S. Appl. No. 15/075,158, filed Mar. 20, 2016.
Shpiner et al., U.S. Appl. No. 14/967,403, filed Dec. 14, 2015.
Elias et al., U.S. Appl. No. 14/994,164, filed Jan. 13, 2016.
Aibester et al., U.S. Appl. No. 15/063,527, filed Mar. 8, 2016.
Kriss et al., U.S. Appl. No. 15/161,316, filed May 23, 2016.
Roitshtein et al., U.S. Appl. No. 14/961,923, filed Dec. 8, 2015.

CISCO Systems, Inc., "Priority Flow Control: Build Reliable Layer 2 Infrastructure", 8 pages, 2015.

Elias et al., U.S. Appl. No. 15/081,969, filed Mar. 28, 2016.
Gafni et al., U.S. Appl. No. 15/194,585, filed Jun. 28, 2016.

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

Pfister et al., "Hot Spot Contention and Combining in Multistage Interconnect Networks", IEEE Trans on Computers vol. C-34, pp. 943-948, Oct. 1985.

Zhu et al.,"Congestion control for large-scale RDMA deployments", SIGCOMM, ACM, pp. 523-536, Aug. 17-21, 2015.

U.S. Appl. No. 14/994,164 office action dated Jul. 5, 2017.
U.S. Appl. No. 15/075,158 office action dated Aug. 24, 2017.
European Application # 17172494.1 search report dated Oct. 13, 2017.
European Application # 17178355 search report dated Nov. 13, 2017.
U.S. Appl. No. 14/967,403 office action dated Nov. 9, 2017.
U.S. Appl. No. 15/081,969 office action dated Oct. 5, 2017.
U.S. Appl. No. 15/063,527 office action dated Feb. 8, 2018.
U.S. Appl. No. 15/161,316 office action dated Feb. 7, 2018.
U.S. Appl. No. 15/081,969 office action dated May 17, 2018.

(56) References Cited

OTHER PUBLICATIONS

U.S. Appl. No. 15/161,316 Office Action dated Jul. 20, 2018.
U.S. Appl. No. 15/161,316 Office Action dated Dec. 11, 2018.
U.S. Appl. No. 15/469,652 office action dated Nov. 2, 2018.

* cited by examiner

US 10,389,646 B2

EVADING CONGESTION SPREADING FOR VICTIM FLOWS

TECHNICAL FIELD

Embodiments described herein relate generally to communication networks, and particularly to methods and systems for evading congestion spreading for victim data flows.

BACKGROUND

In data communication networks, network congestion may occur, for example, when a buffer, port or queue of a network switch is overloaded with traffic. Switches in lossless communication networks typically employ flow control measures to prevent upstream switches from causing buffer overflow, which may result in congestion spreading to one or more upstream switches.

Methods for mitigating congestion in communication networks are known in the art. For example, U.S. Pat. No. 8,879,396, whose disclosure is incorporated herein by reference, describes system and method that can prevent traffic congestion in a middleware machine environment with a plurality of switches in a fat-tree topology. A subnet manager can sweep a subnet in the middleware machine environment to discover changes and maintain the subnet fully connected. A performance manager can retrieve performance and error-related information from one or more performance management agents that are associated with one or more components in the subnet. Then, a host can dynamically reconfigure one or more virtual lanes in order to improve network performances.

U.S. Pat. No. 7,821,939, whose disclosure is incorporated herein by reference, describes adaptively controlled congestion in a data center Ethernet (DCE) network. Packets are received over at least one virtual lane in the DCE network. An absolute or relative packet arrival rate is computed over a time period. The absolute or relative packet arrival rate is compared to at least a first threshold and a second threshold. If the absolute or relative packet arrival rate increases beyond the first threshold, the packet transmission rate is caused to decrease. If the absolute or relative packet arrival rate is less than a second threshold, the packet transmission rate is caused to increase.

In some congestion control strategies, a congested switch sends a notification to relevant source nodes to take measures for resolving congestion, such as reducing the rate in which data is injected into the network. For example, U.S. Pat. No. 9,426,085, whose disclosure is incorporated herein by reference, describes an apparatus that comprises a switch operating in a switch fabric. The switch is configured to receive a data packet having a destination address of a destination device from a source device, and then store the data packet in a queue of the switch. The switch is configured to define a message based on the queue having an available capacity less than a threshold, and include a congestion root indicator in the message if the switch is a congestion root. The switch is then configured to send the message to the source device such that the source device sends another data packet having the destination address of the destination device to another switch from the set of switches and not to the previous switch if the message includes the congestion root indicator.

SUMMARY

An embodiment that is described herein provides a network switch that includes switching circuitry and multiple ports. The multiple ports are connected to a communication network. The switching circuitry is configured to receive via the ports packets that are assigned respective Virtual Lanes (VLs), and forward each packet for transmission via a respective selected port, to queue the packets pending for transmission via a given port in multiple VL-dedicated queues, in accordance with the VLs assigned to the packets, to mark an outbound packet, pending for transmission via the given port, with multiple congestion indications that are indicative of respective congestion states of the multiple VL-dedicated queues of the given port, and to transmit the marked outbound packet via the given port.

In some embodiments, the switching circuitry is configured to determine the congestion states of the multiple VL-dedicated queues based on respective occupancies of the VL-dedicated queues, and available flow-control credits received from one or more downstream network switches. In other embodiments, the switching circuitry is configured to mark the outbound packet, by combining congestion indications relating to the VL-dedicated queues of the network switch, with respective congestion indications with which the packet was already marked when it was received at the network switch. In yet other embodiments, the switching circuitry is configured to combine the congestion indication associated with a given VL by calculating a combined congestion indication that reflects the congestion states of one or more VL-dedicated queues of the given VL in respective switches upstream to, and including, the network switch.

In an embodiment, the switching circuitry is configured to mark the outbound packet independently of congestion states in other switches in the communication network. In another embodiment, the outbound packet is associated with a first VL, and the switching circuitry is configured to mark the outbound packet with a congestion indication indicative of a congestion state of a VL-dedicated queue of a second VL, different from the first VL.

There is additionally provided, in accordance with an embodiment that is described herein, a method, including, in a network switch that includes multiple ports connected to a communication network, receiving via the ports packets that are assigned respective Virtual Lanes (VLs), and forwarding each packet for transmission via a respective selected port. The packets pending for transmission via a given port are queued in multiple VL-dedicated queues, in accordance with the VLs assigned to the packets. An outbound packet, pending for transmission via the given port, is marked with multiple congestion indications that are indicative of respective congestion states of the multiple VL-dedicated queues of the given port. The marked outbound packet is transmitted via the given port.

There is additionally provided, in accordance with an embodiment that is described herein, a network adapter that includes circuitry and one or more ports. The one or more ports are connected to a communication network. The circuitry is configured to receive from a destination node, via the ports, a packet that is marked with multiple congestion indications that are indicative of respective congestion states corresponding to multiple respective Virtual Lanes (VLs), to select, based on the multiple congestion indications, a VL for subsequent packets that originate from the network adapter and are destined to the destination node, and to assign the selected VL to the subsequent packets, and schedule transmission of the subsequent packets to the destination node over the communication network using the assigned VL.

In some embodiments, the packets destined to the destination node include a sequence of packets sharing the selected VL and traversing a route of multiple switches in the communication network, and the circuitry is configured to determine a route-based congestion state for the sequence based on the multiple congestion indications, and to select the VL based on the route-based congestion state. In other embodiments, in response to determining that the sequence is routed via at least one root-of-congestion switch along the route, the circuitry is configured to select the VL to be uniquely shared by sequences routed through root-of-congestion switches.

In an embodiment, in response to determining that the sequence is routed via one or more congested switches along the route that are not root-of-congestion switches, the circuitry is configured to select the VL from among one or more VLs that are not used by sequences routed through a congested switch along the route. In another embodiment, in response to determining that all the switches along the route are non-congested, the circuitry is configured to assign the selected VL unchanged.

There is additionally provided, in accordance with an embodiment that is described herein, a method, including, in a network adapter that connects to a communication network using one or more ports, receiving from a destination node, via the ports, a packet that is marked with multiple congestion indications that are indicative of respective congestion states corresponding to multiple respective Virtual Lanes (VLs). Based on the multiple congestion indications, a VL is selected for subsequent packets that originate from the network adapter and are destined to the destination node. The selected VL is assigned to the subsequent packets, and transmission of the subsequent packets to the destination node over the communication network using the assigned VL is scheduled.

These and other embodiments will be more fully understood from the following detailed description of the embodiments thereof, taken together with the drawings in which:

DETAILED DESCRIPTION OF EMBODIMENTS

Overview

Figure 1:
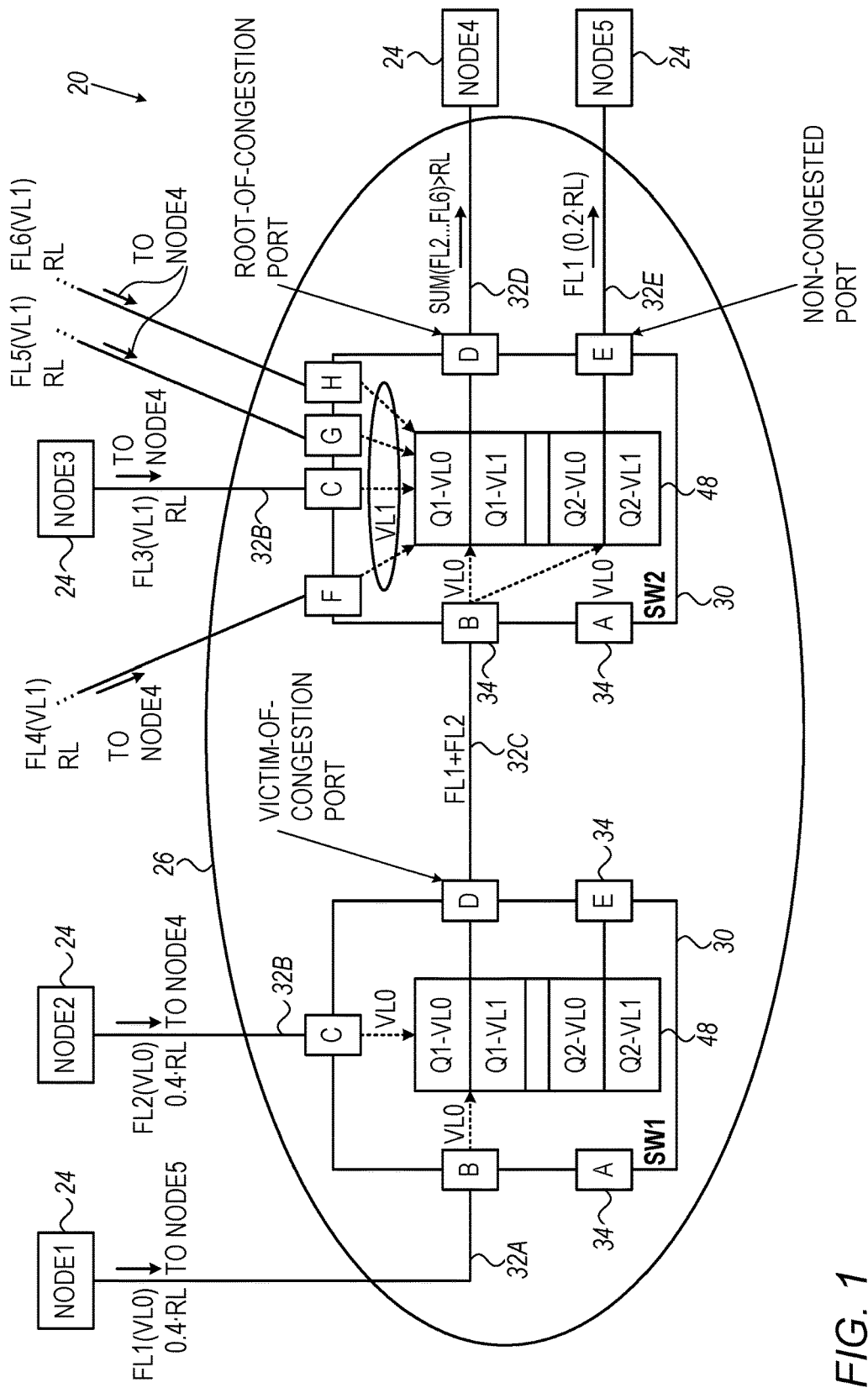
FIG. 1 is a block diagram that schematically illustrates a system for data communication, in accordance with an embodiment that is described herein.

A network switch typically stores packets pending transmission via a given port in a respective egress queue associated with the port. In some network types, such as the InfiniBand switch fabric, flow control techniques are used to prevent packet loss. In such networks, a switch transmits data to a next-hop switch when the next-hop switch has sufficient buffering space for accepting the traffic.

The network switches are interconnected via communication links that are also referred to simply as "links," for brevity. A link may be oversubscribed, when the data rate of the traffic directed to this link exceeds the respective link rate. The actual data rate over a link may degrade due to flow-control backpressure applied by downstream switches.

A switch port may become congested when its egress queue overfills because the data rate of the traffic filling the queue exceeds the emptying rate, which depends on the actual available link rate. A switch having a congested port is also referred to as a "congested switch." The effect of flow-control backpressure may spread and cause congestion in upstream switches, which may eventually result in severe performance degradation over large parts of the communication network.

End network nodes (e.g., compute nodes) may communicate with one another over the communication network by connecting to respective network switches. A source node typically sends to a destination node a sequence of packets, also referred to as a "data flow," at a desired data rate.

In the description that follows, we refer mainly to communication networks in which the data flows are assigned respective Virtual Lanes (VLs) selected from among multiple predefined VLs. In such networks, the switches store outbound packets in multiple VL-dedicated queues according to the respective VLs. In addition, by applying separate flow control to the different VLs, a physical inter-switch link can be viewed as comprising multiple logical links, serving the respective VLs. The bandwidth of the physical link may be shared dynamically by one or more logical links.

A data-flow traversing a path or route of multiple switches (and links) between the source and destination nodes may suffer rate degradation because of one or more congested switches along the route. Such a data flow is referred to as a "congested flow."

Embodiments that are described herein provide systems and methods for evading congestion spreading for at least some of the congested flows. In the disclosed techniques, data flows are classified into one of the following route-based congestion states—"contributor flow," "victim flow" or "non-congested flow." As will be described below, classifying the data flows is based on multiple congestion indications collected by switches along the route for multiple respective VLs.

In some embodiments, based on the data-flow classification, a common VL is assigned to contributor flows, and VLs other than this common VL are assigned to victim flows. Using this approach, a victim flow can be re-assigned a VL that is currently unused or shared by non-congested data flows, thereby evading congestion.

In some embodiments, at least some of the switches along the route mark a traversing packet with multiple congestion indications, as described herein. A given switch marks an outbound packet pending for transmission via a given port, with multiple congestion indications that are indicative of respective congestion states of the multiple VL-dedicated queues of the given port. In an embodiment, the congestion state of each VL-dedicated queue may be determined, for example, based on the queue occupancy and flow-control credits available for this VL-dedicated queue.

Note that each switch marks the packet by monitoring its own VL-dedicated queues, i.e., independently of congestion states that may occur in other switches. A visibility regarding the congestion states of multiple data flows sharing links along the route is achieved by accumulating VL congestion indications for the respective VLs used by these data flows, over the traversing packets.

In some embodiments, the destination node receives a marked packet, and in response, sends to the relevant source node a feedback packet that includes the collected congestion indications per VL. The source node receives the feedback packet and uses the multiple congestion indications to classify the data flow in question. Based on the classification, the source node selects for the data flow a VL, to be used in transmitting subsequent packets, as described above.

By using the disclosed techniques, a source node gets visibility to VL-related congestion states of the switches along the route, for its own selected VL, as well as for VLs assigned to other data flows sharing links along the route. This wide visibility enables the source node to evade congestion for a victim flow by selecting a suitable VL.

System Description

FIG. 1 is a block diagram that schematically illustrates a system 20 for data communication, in accordance with an embodiment that is described herein. System 20 comprises network nodes 24, such as compute nodes, which communicate with each other over a communication network 26 by sending over the network data units that are referred to as packets. Communication network 26 comprises multiple network switches 30, of which only SW1 and SW2 are depicted in the example of FIG. 1. Switches 30 are connected to one another and to network nodes using links 32.

System 20 may be used in various applications such as, for example, data centers, High Performance Computing (HPC) systems, distributed computing systems, or any other application in which network nodes communicate over a communication network.

Communication network 26 may comprise any suitable communication network such as for example, an InfiniBand (IB) switch fabric, Intel's Omni-Path network, or packet networks of other sorts, such as Ethernet or Internet Protocol (IP) networks. Alternatively, communication network 26 may operate in accordance with any other suitable standard or protocol.

A network node typically serves as a source node, destination node or both. As a source node, the network node sends to another node serving as a destination node, a sequence of packets, also referred to as a "data flow," at a desired data rate. The data flow may be identified using any method, such as, for example, by a five-tuple comprising the source and destination addresses, source and destination port numbers, and the underlying communication protocol. The data-flow packets traverse a route of multiple switches 30 between the source and destination network nodes.

In the example of FIG. 1, NODE1 transmits a data flow denoted FL1 to NODE5. Additionally, NODE2 and NODE3 transmit data flows denoted FL2 and FL3, respectively, to NODE4. Further additionally, flows denoted FL4, FL5 and FL6 (whose source nodes are omitted from the figure for clarity) are also destined to NODE4.

Switch 30 comprises multiple ports 34 by which the switch connects to other switches and to network nodes. In the present example, switch SW1 comprises five ports denoted A . . . E, and switch SW2 comprises eight ports denoted A . . . H. An output port is associated with a respective egress queue 48 that stores packets pending transmission via this port. A single egress queue may store packets of multiple different data flows. As traffic flows through a network switch, packets in the egress queue of the switch are delivered to the ingress queue of the downstream switch to which it is connected.

In system 20, each data flow is assigned a respective Virtual Lane (VL) selected from among multiple predefined VLs. In addition, the egress queues associated respectively with the output ports in switch 30 are divided into multiple VL-dedicated queues. In the example of FIG. 1, two VLs denoted VL0 and VL1 are used. Output port D of switches SW1 and SW2 is associated with two VL-dedicated queues denoted Q1-VL0 and Q1-VL1, and output port E is associated with VL-dedicated queues denoted Q2-VL0 and Q2-VL1. In the present example, VL0 is assigned to both data flows FL1 and FL2, and VL1 is assigned to FL3 . . . FL6.

In the description that follows, communication network 26 represents a data communication network and protocols for applications whose reliability does not depend on upper layers and protocols, but rather on flow control, and therefore data packets transmitted along the network should not be dropped by the network switches. Networks of this sort are also referred to as "lossless networks."

Examples of lossless networks that apply credit-based flow control include the InfiniBand switch fabric and Intel's proprietary Omni-Path network. InfiniBand is specified, for example, by the InfiniBand Trade Association, in "InfiniBand Architecture Specification, Release 1.3," volume 1, annex 10, March, 2015, which is incorporated herein by reference.

Lossless networks that handle flow control using PAUSE notifications include, for example, Ethernet variants such as described in the IEEE specifications 802.3x, 1997, and 802.1Qbb, Jun. 16, 2011, which are both incorporated herein by reference. In Ethernet networks, VLs are typically referred to as "priorities." Nevertheless, the disclosed techniques are applicable in various other protocols and network types.

Next we describe an example traffic pattern that results in congestion in network 26. Data flow FL1 originating in NODE1 is received in port SW1-B via link 32A, and routed via port SW1-D to port SW2-B over link 32C. SW2 routes FL1 via port SW2-E toward NODE5. Data flow FL2 is received in port SW1-C via link 32B and routed to port SW1-D, and then via SW2 from port SW2-B to SW2-D, toward NODE4. Each of data flows FL3, FL4, FL5 and FL6 passes through SW2 from respective ports SW2-C, SW2-F, SW2-G and SW2-H to SW2-D, also toward NODE4.

Let RL denote the line rate across the network interconnections. In the present example, the data rates of each of data flows FL1, FL2 is given by 0.4·RL, and the data rate of each of data flows FL3 . . . FL6 is given by RL. Assuming that switches upstream to SW1 and SW2 are non-congested, each of ports SW1-B and SW1-C of SW1 receives traffic having a data rate 0.4·RL. The traffic received in both ports SW1-B and SW1-C is queued in output queue Q1-VL0 of port SW1-D. The traffic sent over link 32C has a maximal data rate of 0.4·RL+0.4·RL=0.8·RL (i.e., in case port SW1-D suffers no backpressure). In SW2, the packets received via port SW2-B are directed so that packets belonging to FL1 are routed to port SW2-E and stored in Q2-VL0, and packets belonging to FL2 are routed to port SW2-D and stored in queue Q1-VL0. In addition, packets received via port SW2-C, as well as via SW2-F, SW-G and SW2-H, are routed to port SW2-D and stored in Q1-VL1.

In this example, the combined rates of FL2 and FL3 . . . FL6, which are all destined to NODE4 via port SW2-D, exceeds the link rate RL, and therefore link 32D is oversubscribed. Therefore, assuming that none of the switches along the path from port SW2-D to NODE4 is congested, port SW2-D transmits data at the link rate RL, but Q1-VL0 and Q1-VL1 build up. Port SW2-D is therefore a "root-of-congestion" port. Assuming in addition that all the switches along the path between port SW2-E and NODE5 are non-congested, port SW2-E transmits at a data rate of up to the FL1 data rate, i.e., 0.4·RL.

Since packets queued in Q1-VL0 (and Q1-VL1) of SW2 can be sent via port SW2-D at a combined data rate up to RL, the packets in Q1-VL0 (and Q1-VL1) of SW2 are accumulating, and flow-control backpressure is created toward port SW1-D, therefore preventing SW1 from sending FL1 and FL2 at their full rates. Specifically, assuming arbitration at the output ports with equal priorities, each of the five flows FL2 . . . FL6 is transmitted out of port SW2-D at a rate 0.2·RL. As a result, SW2-B can receive data at a rate up to 0.2·RL (FL2) plus 0.4·RL (FL1), i.e., 0.6·RL. Under these conditions, port SW1-D is a "victim-of-congestion" port. Moreover, assuming again transmitting with equal priorities, SW1-D transmits each of FL1 and FL2 at a rate 0.2·RL, which is below its nominal rate. Note that FL2 is limited to rate 0.2·RL, which prevents FL1 from being transmitted faster from port SW1-D due to buffer clogging.

Data flows that suffer rate degradation due to congestion can be classified into two categories as follows. A data flow whose packets are routed via a root-of-congestion port in at least one switch along the path from the source node to the destination node is referred to herein as a "contributor flow." A data flow whose packets are routed via at least one victim port along the route from the source node to the destination node, but not via any root-of-congestion port, is referred to herein as a "victim flow." In accordance with the above terminology, FL1 in the present example is a "victim flow," whereas FL2 and FL3 . . . FL6 are "contributor flows."

Note that data flow FL1 suffers rate degradation because it shares VL0 with FL2, which is routed via the root-of-congestion port SW2-D. By re-assigning VL1 to data flow FL1 (and the other flows FL2 . . . FL6 to VL0), FL1 would be queued in Q1-VL1 of SW1 and in Q2-VL1 of SW2, and would be delivered at its full rate (or close to its full rate) from NODE1 to NODE5.

As will be described in detail below, in some embodiments, congested data flows are classified, based on congestion indications of multiple respective VLs, are classified as contributor flows or victim flow. Then, VLs assigned to the data flows such that victim flows do not share VLs with contributor flows, to evade congestion and congestion spreading for the victim flows.

Figure 2:
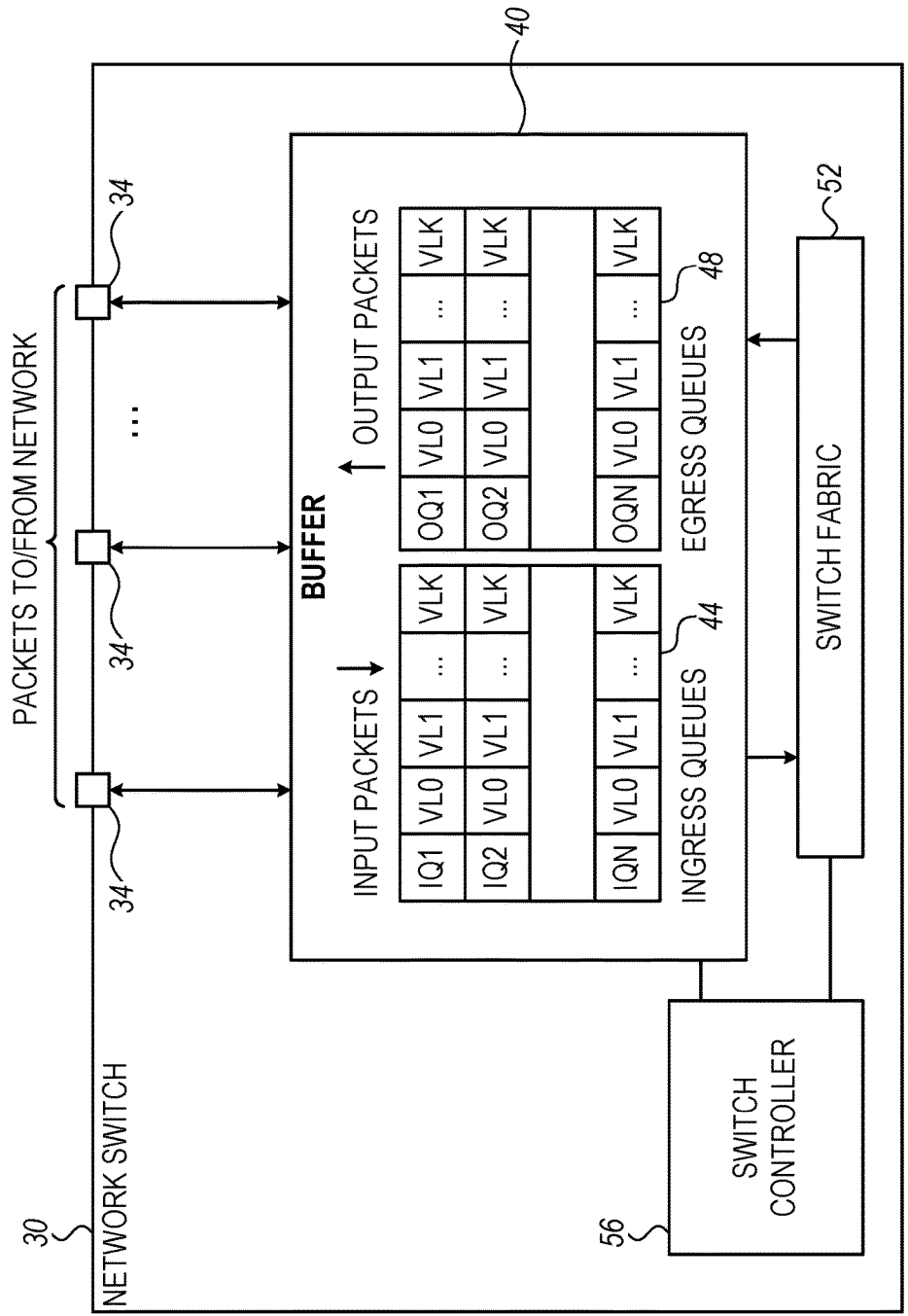
FIG. 2 is a block diagram that schematically illustrates a network switch, in accordance with an embodiment that is described herein.

FIG. 2 is a block diagram that schematically illustrates a network switch 30, in accordance with an embodiment that is described herein. Switch 30 may be a building block in any suitable communication network such as, for example, an InfiniBand (IB) switch fabric. Alternatively, switch 30 may be comprised in a communication network that operates in accordance with any other suitable standard or protocol. Typically, multiple network elements such as switch 30 interconnect to build a communication network.

Although in the description that follows we mainly refer to a network switch, the disclosed techniques are applicable to other suitable types of network elements such as, for example, a router, bridge, gateway, or any other suitable type of network element.

In the present example, switch 30 comprises multiple ports 34 for exchanging data packets over the network. In some embodiments, a given port 34 functions both as an ingress interface for incoming packets and as an egress interface for outgoing packets. Alternatively, port 34 can function as either ingress or egress interface. A port functioning as an ingress interface for incoming packets is also referred to herein as an "ingress port" or "input port." A port functioning as an egress interface for outgoing packets is also referred to herein as an "egress port" or "output port."

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Switch 30 comprises a buffer 40, which comprises one or more ingress queues 44 for storing packets arriving from the network via the ingress interfaces of ports 34, and one or more egress queues 48 for storing packets awaiting transmission to the network via the egress interfaces of ports 34. Buffer 40 may comprise, for example, a shared buffer.

In the example of FIG. 2, buffer 40 comprises N ingress queues denoted IQ1 . . . IQN and N egress queues denoted OQ1 . . . OQN. Each of the ingress and egress queues comprises multiple VL-dedicated queues denoted VL0 . . . VLK. Packets that belong to a given VL are queued in a VL-dedicated queue allocated to this given VL in an ingress or egress queue corresponding to the relevant ingress or egress port. In alternative embodiments, any other suitable buffering configuration can also be used.

Switch 30 further comprises a configurable switch fabric 52, which forwards packets between ingress ports and egress ports, typically via respective ingress and/or egress queues, in accordance with a predefined routing plan. Switch fabric 52 may be implemented using any suitable method, such as, for example, applying to the packets routing rules.

Switch 30 comprises a switch controller 56, which performs the various management and other functions of switch 30. For example, switch controller 56 configures switch fabric 52 to apply the desired routing plan. In some embodiments, switch controller 56 detects fault conditions and performance bottlenecks such as congestion.

Switch controller 56 may locally detect congestion in various ways. In some embodiments, for a packet pending transmission via a respective egress interface, the switch controller detects multiple congestion states for multiple respective VL-dedicated egress queues associated with the egress interface. The switch marks the packet with multiple congestion indications corresponding to the multi-VL congestion states. Methods for reporting the multi-VL congestion indications to the relevant source node, and for selecting a VL, by the source node, based on the multiple congestion indications, are described in detail below.

Figure 3:
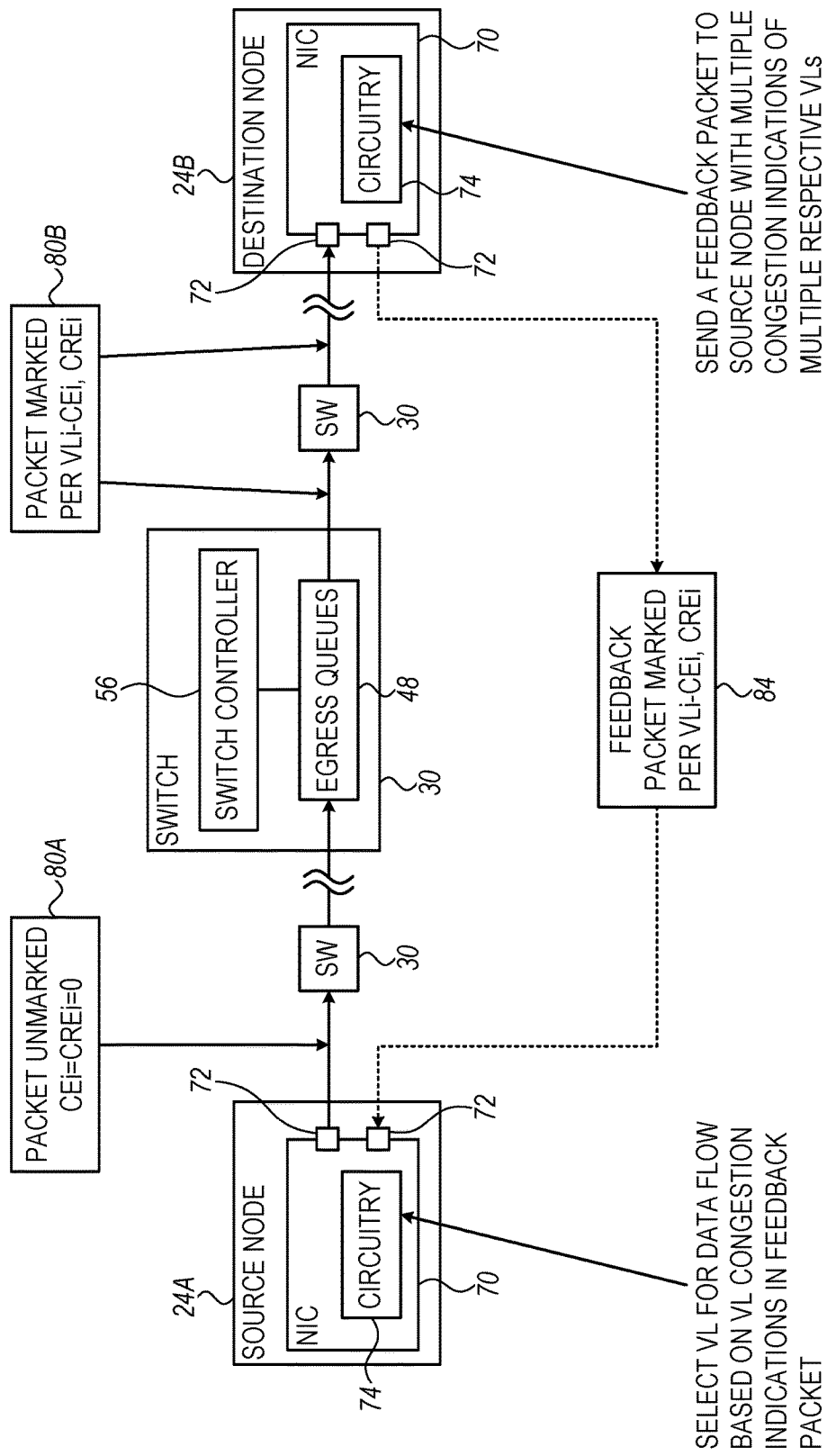
FIG. 3 is a diagram that schematically illustrates a method for mitigating congestion spreading based on congestion indications of multiple Virtual Lanes (VLs), in accordance with an embodiment that is described herein.

Mitigating Congestion Spreading Based on
Congestion Indications of Multiple Virtual Lanes FIG. 3 is a diagram that schematically illustrates a method for mitigating congestion spreading based on congestion indications of multiple Virtual Lanes (VLs), in accordance with an embodiment that is described herein.

In FIG. 3, a source node 24A communicates with a destination node 24B over communication network 26, by sending a data flow of packets via a route of multiple switches 30. Prior to starting sending the data flow, the NIC of the source node assigns an initial VL value to the data flow. In an example embodiment, assuming the communication network supports multiple predefined VLs denoted VL0 ... VLK, the NIC of the source node selects an initial default VL, e.g., VL0. Alternatively, other suitable methods for selecting an initial VL for the data flow can also be used.

Each network node 24 comprises a Network Interface Controller (NIC) 70 that comprises one or more ports 72 for connecting to communication network 26. Port 72 may comprise an ingress interface for receiving packets, an egress interface for outputting packets or both (not shown in the figure). NIC 70 additionally comprises NIC circuitry 74 that carries out the various functions of the NIC.

In some embodiments, the packets of the data flows traversing the network comprise a header with multiple congestion indications corresponding to multiple respective VLs. The source node initially unmarks all the congestion indications of a packet pending transmission to a non-congested state, as depicted by packet 80A. As the packet traverses the switches along the route, each switch monitors the congestion state per VL-dedicated queue of the egress port to which the packet is routed, and cumulatively marks the congestion indications in the packet's header, as depicted by packet 80B.

The NIC at the destination node receives the marked packet, generates a feedback packet 84 that includes the congestion indications collected along the route, and sends the feedback packet over the network back to the source node. Based on the multiple congestion indications, the source node selects a VL for subsequent packets of the data flow, as will be described in detail below.

In some embodiments, instead of sending a dedicated feedback packet, the NIC of the destination node sets the multi-VL congestion indications in a header of a packet that is sent within a data-flow sequence from the destination node to the source node.

In some embodiments, at the switch level, the congestion state per VL is determined based on egress queue occupancy and flow-control credits. A VL for which the occupancy of the respective VL-dedicated queue exceeds a predefined threshold, but has no flow-control credits available (because of flow control backpressure on the specific VL-dedicated queue) is referred to herein as a "VL-victim." A VL for which the VL-dedicated queue is overfilled even though the VL-dedicated queue has flow-control credits available is referred to herein as a "VL-root." A VL for which the occupancy of the VL-dedicated queue in less than required to be identified as overfilled is referred to herein as a "VL-non-congested."

In some embodiments, the congestion indication per VLi comprises two bits denoted Congestion Encountered (CEi) and Congestion Root Encountered (CREi). The switch controller monitors the VL-dedicated queues of a respective egress port, determines for each VL its respective congestion state, and sets the congestion indication bits accordingly. Table 1 depicts an example mapping between the VL congestion states and the congestion indication bits.

TABLE 1

Example mapping between VL congestion states and congestion indication bits

| VLi congestion state | CEi bit | CREi bit |
|---|---|---|
| VLi-non-congested | 0 | 0 |
| VLi-victim | 1 | 0 |
| VLi-root | 1 | 1 |

The congestion state of an egress port can be deduced from the individual congestion states of its VL-dedicated queues, as described herein. A port is a root-of-congestion port if at least one of its (egress) VL-dedicated queues is building up even though the port outputs data at the link rate across all the VL-dedicated queues. A root-of-congestion port has at least one VL-dedicated queue that is identified as a VL-root. Similarly, a port is a victim-of-congestion port if at least one of its VL-dedicated queues is building up because the port cannot output data at the link rate across all the VL-dedicated queues due to flow control backpressure on one or more of the VL-dedicated queues. A victim-of-congestion port has at least one VL-dedicated queue that is identified as a VL-victim, but does not have any VL-dedicated queues that are identified as VL-roots.

Table 2 below depicts examples of possible congestion indications in a feedback packet for VLs VL0 ... VL4. Each line in the table comprises five VL congestion indications that each comprises a CE bit and a CRE bit. We assume that the congestion indications were collected along some route of switches from a source node to a destination node.

TABLE 2

Examples of five VL congestion indications

| Example Number | VL0 | | VL1 | | VL2 | | VL3 | | VL4 | |
|---|---|---|---|---|---|---|---|---|---|---|
| | CE0 | CRE0 | CE1 | CRE1 | CE2 | CRE2 | CE3 | CRE3 | CE4 | CRE4 |
| 1 | 0 | 0 | 0 | 0 | 0 | 0 | 0 | 0 | 0 | 0 |
| 2 | 0 | 0 | 0 | 0 | 1 | 0 | 1 | 0 | 0 | 0 |
| 3 | 0 | 0 | 1 | 1 | 0 | 0 | 0 | 0 | 1 | 0 |

In the first line of Table 2, the CE and CRE bits of all VLs equal 0. This indicates that none of the data flows that share at least one link along the route and use one of VL0 ... VL4 is congested. In the second line of Table 2, the CE and CRE bits of all VLs equal 0, except CE2 and CE3 that are set to 1. In this case, data flows that share the route and use VL2 or VL3 are congested, but since CRE2=CRE3=0, these data flows are victim flows. In the third line of Table 2, CE1, CRE1, CE4 and CRE4 bits are set to 1, and all the other CE and CRE bits equal 0. In this case, data flows that share the route and use VL1 are contributor flows, and data flows that share the route and use VL4 are victim flows.

The port classification described above similarly applies to the switch level. As such, a switch having a root-of-congestion port is referred to herein as a "root-of-congestion switch," and a switch having a victim-of-congestion port is referred to herein as a "victim-of-congestion switch."

The switch, NIC and communication network configurations shown in FIGS. 1-3 are example configurations, which are chosen purely for the sake of conceptual clarity. In alternative embodiments, any other suitable switch, NIC and/or communication network configurations can also be used. For example, although the embodiments described herein refer mainly to network switches, the disclosed techniques can be implemented in various other types of network elements such as routers.

Certain switch elements and NIC elements may be implemented using hardware/firmware, such as using one or more Application-Specific Integrated Circuits (ASICs) or Field-Programmable Gate Arrays (FPGAs). Alternatively, some switch elements and NIC elements may be implemented in software or using a combination of hardware/firmware and software elements.

In some embodiments, certain switch functions, such as certain functions of switch controller 56, as well as certain NIC functions, such as certain functions of NIC circuitry 74, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, the switch comprises multiple ports 34 and other elements. In the description that follows and in the claims, the term "switching circuitry" refers to all the elements of the switch excluding the ports. In the example of FIGS. 1 and 2, the switching circuitry comprises, buffer 40, switch fabric 52 and switch controller 56 of switch 30.

Figure 4:
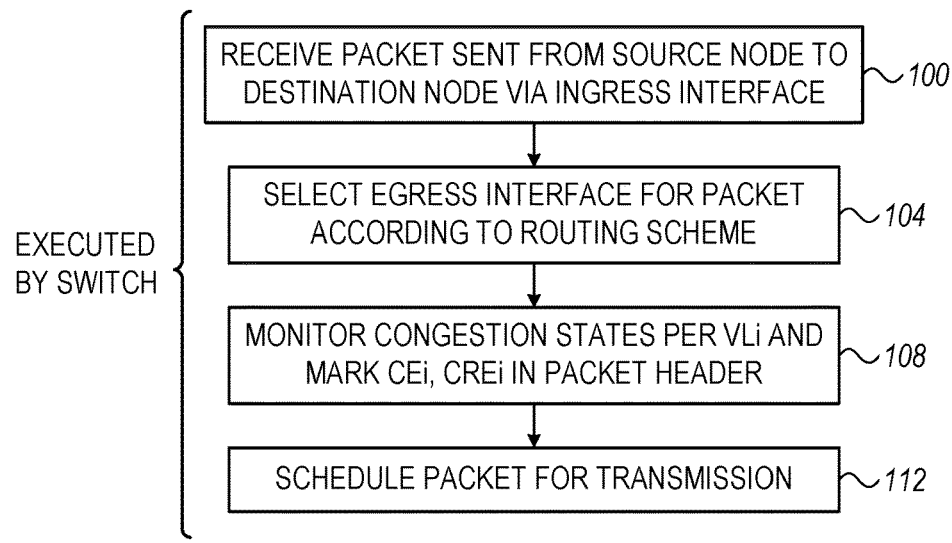
FIG. 4 is a flow chart that schematically illustrates a method for marking packets traversing a communication network with multiple congestion indications of respective VLs, in accordance with an embodiment that is described herein.

A Method for Marking a Packet with Multiple Congestion Indications of Respective VLs FIG. 4 is a flow chart that schematically illustrates a method for marking packets traversing a communication network with multiple congestion indications of respective VLs, in accordance with an embodiment that is described herein. The method of FIG. 4 may be executed, for example, by switch controller 56 of switch 30.

The method begins with the switch controller receiving, via an ingress interface, a packet that belongs to a data flow sent from a source node to a destination node, at a reception step 100. The switch controller stores the packet in a VL-dedicated queue of the ingress interface assigned to the packet's VL. At a routing step 104, the switch controller selects for the received packet an egress interface, e.g., using switch fabric 52, and stores the packet in a respective VL-dedicated queue of the selected egress interface.

At a multi-VL monitoring step 108, the switch controller monitors the congestion states of multiple respective VL-dedicated queues of the selected egress interface, and marks respective VL congestion indications in a header of the packet. Note that the switch marks the packet not only with a congestion indication related to the VL assigned to the packet, but also with one or more congestion indications that are indicative of congestion states of the VL-dedicated queues of other respective VLs.

In some embodiments, the switch maps the congestion state of each VLi whose VL-dedicated queue has been monitored into a two-bit congestion indication (CEi, CREi), e.g., using Table 1 above. In an embodiment, the switch marks the packet by combining the locally determined VL congestion indications with the respective VL congestion indications in the packet header. By using such combining to mark the packet, the individual congestion indications for each VL are accumulated separately along the route. For example, the switch may combine the congestion indications by applying a bitwise logical OR operation between the locally determined CEi and CREi bits and the respective CEi and CREi bits in the packet header. Note that for accumulating or combining congestion indications that are defined differently from CEi and CREi above, a suitable logical operation, possibly other than OR, may be required.

In combining the congestion indications, the switch combines the congestion indication associated with a given VL by calculating a combined congestion indication that reflects the congestion states of one or more VL-dedicated queues of the given VL in respective switches upstream to, and including, the network switch.

At a transmission step 112, the switch controller schedules transmission of the packet that was marked at step 108, and the method terminates.

Figure 5:
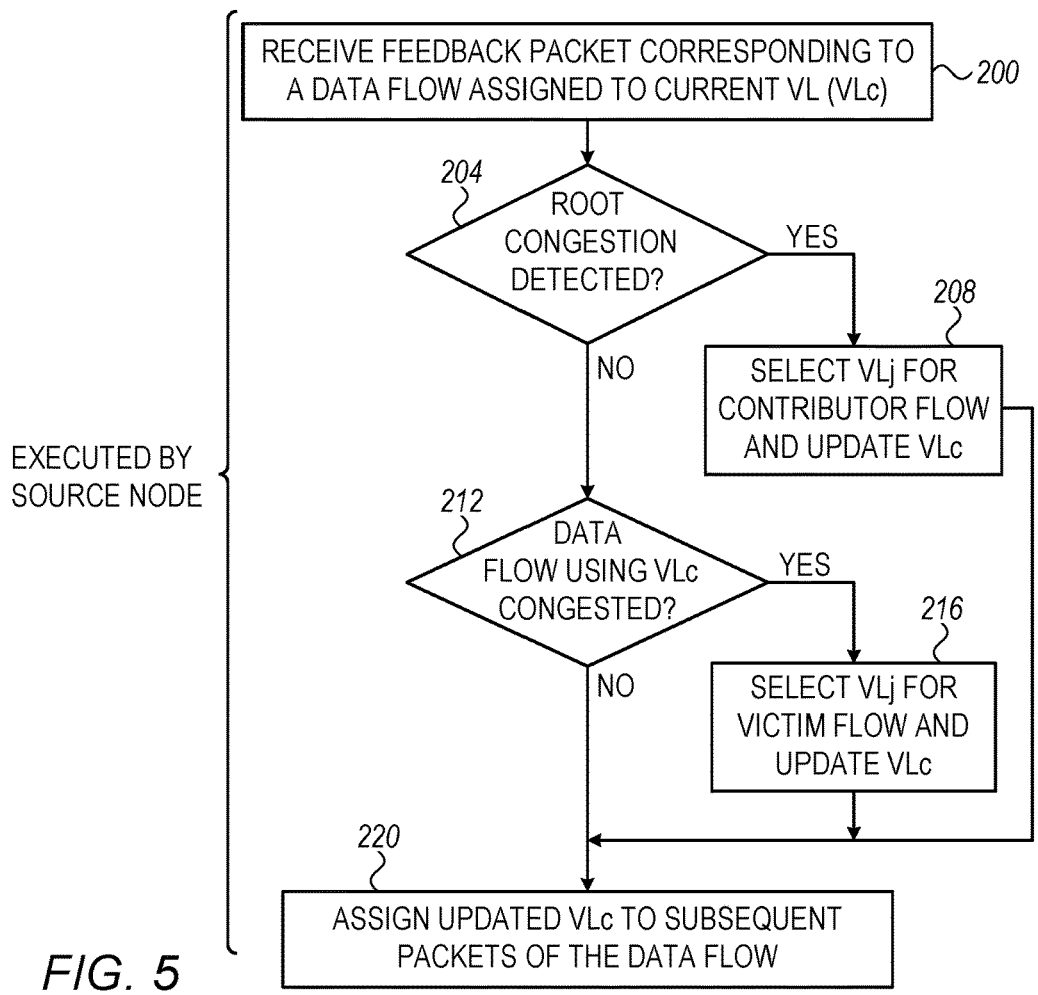
FIG. 5 is a flow chart that schematically illustrates a method for selecting a VL for a data flow based on multiple VL congestion indications, in accordance with an embodiment that is described herein.

A Method for VL Selection Based on Multiple Congestion Indications of Respective VLs FIG. 5 is a flow chart that schematically illustrates a method for selecting a VL for a data flow based on multiple VL congestion indications, in accordance with an embodiment that is described herein. The method can be executed, for example, by NIC circuitry 74 of NIC 70, e.g., of source node 24A of FIG. 3.

In describing the method, we assume that the source node is sending packets of a given data flow to a destination node. The source node assigns to the data flow a respective VL, whose current value is denoted VLc.

The methods begin with the NIC circuitry receiving a feedback packet from the destination node. The feedback packet includes multiple congestion indications of multiple respective VLs that were collected by the switches along the source-to-destination route, as described above. In an embodiment, the congestion indication corresponding to VLi comprises a CEi bit and a CREi bit as described above with reference to FIG. 3.

At a root congestion checking step 204, the NIC circuitry checks whether the data flow traverses a root-of-congestion port in a switch along the route, based on the multi-VL indications. In an embodiment, the NIC circuitry implements step 204 by checking whether there are one or more VLj for which the respective CREj bit in the feedback packet is set.

If at step 204 the NIC circuitry detects root congestion, the data flow currently using VLc is a contributor flow, and the NIC circuitry selects a VLj for the data flow at a VL-selection for contributor step 208. For example, the NIC circuitry selects a VLj using the expression j=min{j: CREj==1}, i.e., selects the VLj having the minimal index among the VLs indicating root congestion in the feedback packet.

Alternatively, no root congestion was detected at step 204, and the NIC circuitry proceeds to a victim congestion checking step 212. At step 212, the NIC circuitry checks whether the data flow using the current VLc is congested. In an embodiment, the NIC circuitry implements step 212 by checking whether the CEc bit (corresponding to VLc) in the feedback packet is set.

If at step 212 the NIC circuitry determines that the data flow using VLc is congested, the data flow is identified as a victim flow, and the NIC circuitry selects for the data flow a VL different from VLc among the non-congested VLs, at a victim VL selection step 216. For example, the NIC circuitry selects VLj for which j=min{j: CEj==0}. If at step 212 the NIC circuitry determines that the data flow is non-congested, or when the NIC cannot find any CEj bit zeroed, the VLc assigned to the data flow remains unchanged.

Following step 208, 216 or 212—in case of non-congestion, the NIC circuitry proceeds to a transmission step 200. At step 200, the NIC circuitry assigns the recently updated VLc to subsequent packets of the data flow, and the method terminates.

The embodiments described above are given by way of example, and alternative suitable embodiments can also be used. For example, although in the above embodiments the congested state of a VL-dedicated queue was based on the queue occupancy and available flow-control credits, in alternative embodiments, other suitable methods can also be used. For example, the state congestions of a VL-dedicated queue can be determined by estimating the filing and emptying rates of the queue.

Although the embodiments described above refer mainly to network employing credit-based flow control, the disclosed techniques are also applicable, mutatis mutandis, to networks that employ other suitable types of flow control such as using PAUSE signaling.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   one or more ports connected to a communication network; and
   circuitry, configured to:
      transmit via the ports packets that are assigned a given Virtual Lane (VL) from the network adapter to a destination node via a route having multiple switches, wherein the destination node is coupled to the communication network downstream to a source node comprising the network adapter;
      receive from the destination node, via the ports, a packet that was sent by the destination node using upstream transmission, and that is marked with multiple congestion indications that are indicative of respective congestion states corresponding to multiple respective VLs that are available for assigning to packets sent from the network adapter to the destination node using downstream transmission via the route, wherein the multiple congestion indications in the packet are based on congestion indications in a downstream packet produced by at least a switch from among the switches downstream on the route, by combining, by the switch, congestion indications relating to VL-dedicated queues of the switches, with respective congestion indications with which the downstream packet was already marked when received at the switch;
      make a classification of the packets transmitted via the route using the given VL, based on the multiple congestion indications, as belonging to a contributor flow when routed via a root-of-congestion port in at least one switch along the route, or to a victim flow when routed via at least one victim port along the route;
      select, based on the multiple congestion indications and on the classification, a VL for downstream transmission of subsequent packets that originate from the network adapter and are destined to the destination node via the route, so that victim flows do not share VLs with contributor flows; and
      assign the selected VL to the subsequent packets, and schedule downstream transmission of the subsequent packets to the destination node over the communication network via the route using the assigned VL.

2. The network adapter according to claim 1, wherein, the circuitry is configured to determine, based on the multiple congestion indications, that the route comprises at least one root-of-congestion switch, and to select the VL to be uniquely shared by flows routed through root-of-congestion switches.

3. The network adapter according to claim 1, wherein, in response to determining that the route comprises one or more congested switches that are not root-of-congestion switches, the circuitry is configured to select the VL from among one or more VLs that are not used by flows routed through a congested switch along the route.

4. The network adapter according to claim 1, wherein, in response to determining that all the switches along the route are non-congested, the circuitry is configured to assign the selected VL unchanged.

5. A method, comprising:
   in a network adapter of a source node that connects to a communication network using one or more ports, transmitting via the ports packets that are assigned a given Virtual Lane (VL) from the network adapter to a destination node via a route having multiple switches, wherein the destination node is coupled to the communication network downstream to the source node;
   receiving from the destination node, via the ports, a packet that was sent by the destination node using upstream transmission, and that is marked with multiple congestion indications that are indicative of respective congestion states corresponding to multiple respective VLs that are available for assigning to packets sent from the network adapter to the destination node using downstream transmission via the route, wherein the multiple congestion indications in the packet are based on congestion indications in a downstream packet produced by at least a switch from among the switches downstream on the route, by combining, by the switch, congestion indications relating to VL-dedicated queues of the switches, with respective congestion indications with which the downstream packet was already marked when received at the switch;
   making a classification of the packets transmitted via the route using the given VL, based on the multiple congestion indications, as belonging to a contributor flow when routed via a root-of-congestion port in at least one switch along the route, or to a victim flow when routed via at least one victim port along the route;
   selecting, based on the multiple congestion indications and on the classification, a VL for downstream transmission of subsequent packets that originate from the network adapter and are destined to the destination node via the route, so that victim flows do not share VLs with contributor flows; and assigning the selected VL to the subsequent packets, and scheduling downstream transmission of the subsequent packets to the destination node over the communication network via the route using the assigned VL.

6. The method according to claim 5, wherein selecting the VL comprises determining, based on the multiple congestion indications, that the route comprises at least one root-of-congestion switch, and selecting the VL to be uniquely shared by flows routed through root-of-congestion switches.

7. The method according to claim 5, wherein selecting the VL comprises, in response to determining that the route comprises one or more congested switches that are not root-of-congestion switches, selecting the VL from among one or more VLs that are not used by flows routed through a congested switch along the route.

8. The method according to claim 5, wherein assigning the selected VL comprises, in response to determining that all the switches along the route are non-congested, assigning the selected VL unchanged.

\* \* \* \* \*